United States Patent [19]

Shedigian

[11] Patent Number: 4,609,967
[45] Date of Patent: Sep. 2, 1986

[54] DIELECTRIC FLUID FOR A CAPACITOR

[75] Inventor: Vandos Shedigian, Indianapolis, Ind.

[73] Assignee: Emhart Industries, Inc., Indianapolis, Ind.

[21] Appl. No.: 787,045

[22] Filed: Oct. 15, 1985

[51] Int. Cl.$^4$ .............................................. H01G 4/22
[52] U.S. Cl. ..................................... 361/315; 252/567
[58] Field of Search .................. 361/433 E, 327, 314, 361/318, 315, 319; 252/567, 578

[56] References Cited

U.S. PATENT DOCUMENTS

| | | | |
|---|---|---|---|
| 4,381,535 | 4/1983 | Shedigian et al. | 252/567 X |
| 4,420,791 | 12/1983 | Shedigian | 361/315 X |
| 4,459,637 | 7/1984 | Shedigian | 361/327 |
| 4,476,516 | 10/1984 | Shedigian | 252/567 X |
| 4,521,826 | 6/1985 | Shedigian et al. | 361/314 |

*Primary Examiner*—Donald A. Griffin
*Attorney, Agent, or Firm*—Robert F. Meyer; Carl A. Forest

[57] ABSTRACT

A dielectric fluid for a metallized film capacitor consisting essentially of 75 volume % glyceryl triacetate and 25 volume % 3,4-epoxycyclohexylemethyl-3,4-epoxycyclohexane carboxylate. The capacitor body includes metallized polypropylene film forming the electrodes and a separating dielectric.

5 Claims, 4 Drawing Figures

DIELECTRIC FLUID FOR A CAPACITOR

BACKGROUND OF THE INVENTION

This invention relates to dielectric fluids for electrical capacitors, particularly metallized polypropylene film capacitors.

In the manufacture of self-healing capacitors, the selection of the dielectric fluid has a substantial influence on the electrical characteristics of the capacitor. Self-healing occurs when dielectric breakdown of the metallized electrode occurs locally and the breakdown areas are healed. In other words, insulation of the capacitors is restored by flowing of the metal film portions around the short-circuited metallized films. Under powerful arcing dielectric fluid that has penetrated the film degrades and leads to an increase of the dissipation factor and leads to failure of the capacitors. Thus, in metallized polypropylene capacitors, the dielectric fluid should exhibit low swellability of the metallized polypropylene film, high viscosity and high contact angle with the film.

SUMMARY OF THE INVENTION

Accordingly, the present invention resides in a capacitor wherein a dielectric fluid consists essentially of 75 volume % glyceryl triacetate and 25 volume % 3,4-epoxycyclohexylemethyl-3,4-epoxycyclohexane carboxylate. In another form, the present invention includes a capacitor comprising a housing, a pair of convolutely wound metallized film electrodes enclosed within the housing, and the dielectric fluid.

BRIEF DESCRIPTION OF THE DRAWINGS

The present invention is illustratively shown and described in respect to the accompanying drawings in which.

DETAILED DESCRIPTION OF THE INVENTION

Figure 1:
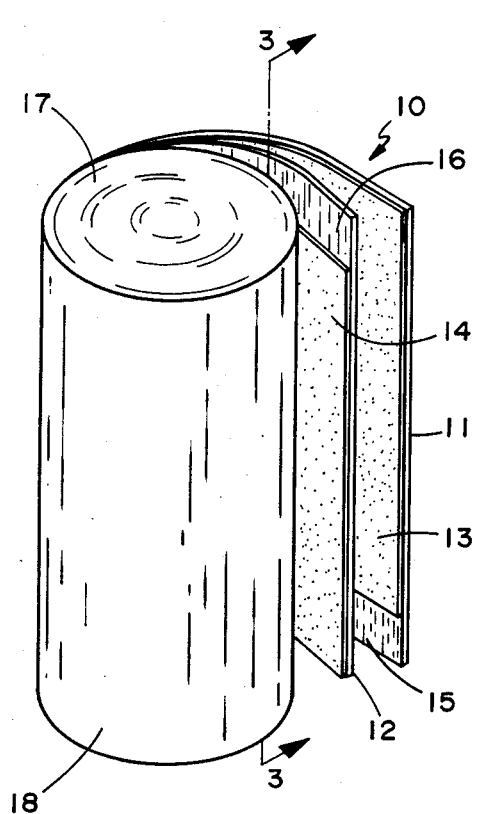
FIG. 1 is a perspective view of a convolutely wound metallized film capacitor body which is partially unwound to show the dielectric plastic film and metallized foil electrode structure.

Referring now to FIG. 1, there is illustrated a convolutely wound ac capacitor body 10. The capacitor body 10 includes a pair of dielectric plastic film layers 11 and 12 and overlying metallized electrodes 13 and 14, respectively. The dielectric plastic film layers 11 and 12 are metallized in such a manner so as provide margins 15 and 16 which are free of metal. Such margins are useful in helping to prevent electrical short circuits between the metallized electrodes at the ends of the capacitor body 10. In convolutely winding the capacitor body 10, the metallized electrode 13 overlying the plastic film 11 is laterally offset with respect to the metallized electrode 14 overlying the plastic film 12 so that metallized electrode 13 and margin 16 appear at end 17 of the capacitor body so that metallized electrode 14 and margin 15 appear at end 18 of the capacitor body.

Figure 2:
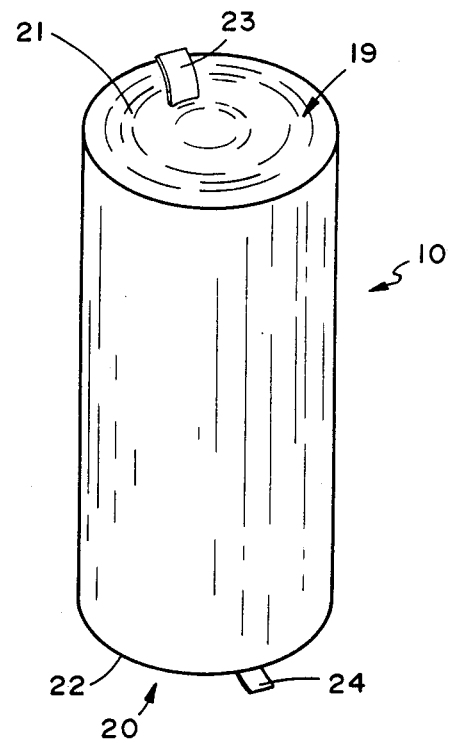
FIG. 2 is a perspective view of the capacitor body of FIG. 1 to which terminal leads are attached.

As shown in FIG. 2, suitable terminal leads 19 and 20 are attached to the ends 17 and 18, respectively, of the capacitor body 10 using any suitable attachment process. The attachment process must not result in electrically conductive material penetrating into the capacitor body 10 to cause the metallized electrode at the capacitor body edge to electrically short the other metallized electrode. An acceptable attachment process includes spraying the ends 17 and 18 of the capacitor body 10 with lead, a lead alloy, aluminum, an aluminum alloy, zinc, a zinc alloy, tin, a tin alloy, nickel, a nickel alloy and the like. The metal material at the ends of the capacitor body 10 are indicated by the reference numerals 21 and 22. Lead strips 23 and 24 are suitably attached to the metal material as shown in FIG. 2. A suitable lead strip material is solder coated copper.

Figure 3:
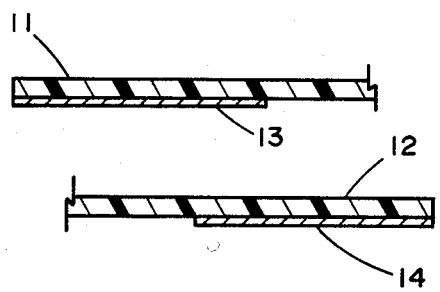
FIG. 3 is a partial sectional view taken across lines 3—3 of FIG. 1.

FIG. 3 is a sectional view taken along the line 3—3 of FIG. 1 but limited to a small section of the capacitor body 10. In FIG. 3, the plastic film layers 11 and 12 and their respective overlying metallized electrodes 13 and 14 are arranged in the same manner as shown in FIG. 1.

Metallized electrode 13 is integrally joined to the plastic film 11 whereas metallized electrode 14 is integrally joined to the plastic film 12. FIG. 3 shows a metallized electrode on but one side of the plastic film; however, the metallized electrode layers may be deposited on both sides of the plastic film. FIG. 3 shows a single side of the plastic film as being metallized. The application of the metallized electrodes 13 and 14 to their respective plastic film may be accomplished by any suitable process such as vapor, chemical or other known metal deposition processes. For example, aluminum can be deposited over the dielectric layer to have a resistivity of about 1 to about 4 ohms per square inch. Depending on the specific operating characteristics desired, the resistivity of each metallized electrode can be more than 4 ohms per square inch or less than 1 ohm per square inch. Generally speaking, a capacitor with high resistivity metallized electrodes tends to suffer a decrease in its capacitance more readily than does a capacitor with lower resistivity electrodes. On the other hand, a capacitor with low resistivity metallized electrodes may not clear or self-heal. The low resistivity metallized electrode capacitor would tend to fail if the dielectric plastic film suffers a breakdown, since the thicker metallized layer would require more energy to produce vaporization of the electrodes around any such breakdown site. Metals other than aluminum may be used as the metallized electrodes provided they do not disintegrate dielectric plastic film and have the desired resistivity. Such other metals include nickel, zinc, tin and the like.

The dielectric plastic films or layers 11 and 12 should have high dielectric strength, low dissipation factor to prevent thermal runaway, broad temperature range capabilities, resistance to the dielectric fluid, and freedom from pinholes and conductive particles. The dielectric film layers 11 and 12 may be of any suitable homogenous polymer or plastic material such as polyester, polyethylene, polycarbonate, polystyrene, polysulfone, polyethylene terephthalate and, preferably, the polyolefins, particularly polypropylene. Polyester is not as desirable as polypropylene because in a-c capacitors it tends to generate too much heat at desired operating voltage stresses. The upper operating temperature of polyethylene is much lower than that of polypropylene. Polycarbonate, polystyrene and polysulfone are not as solvent resistant as a polypropylene.

The presently most preferred polypropylene is biaxially oriented polypropylene for it tends to meet all desirable specifications. Biaxially oriented polypropylene is preferred because it permits an a-c capacitor to operate at high KVAR (kilovolt-ampere reactive) per unit volume due to its high dielectric strength and low dissipation factor and it imbibes little, if any, of the dielectric fluid of this invention.

Figure 4:
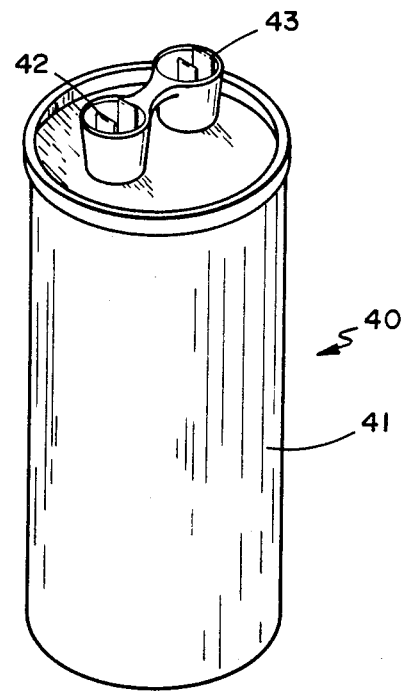
FIG. 4 is a perspective view of the capacitor body of FIGS. 1 and 2 enclosed in a suitable housing.

In FIG. 4, a capacitor body 10 is preferably sealed in a can or housing 40 to form a capacitor 41. Capacitor 41 includes the metal housing or can 40 and terminals 42 and 43. The capacitor body 10 is contained within the housing 40 and terminal lead 23 makes electrical contact with terminal 42 and the remaining terminal lead 24 makes electrical contact with terminal 43.

The dielectric fluid of the present invention fills the housing 40 to exclude air and other gasses therefrom. The fluid consists essentially of 75 volume % glyceryl triacetate and 25 volume % 3,4-epoxycyclohexylmethyl-3,4-epoxycyclohexane carboxylate. Glyceryl triacetate is available from the Eastman Kodak Company as KODAFLEX Triacetin. The 3,4-epoxycyclohexylmethyl-3,4-epoxycyclohexane carboxylate is available from Union Carbide as ERL-4221.

An antioxidant is included in the dielectric liquid to help keep the dissipation factor of the liquid lower for a longer period of time. The preferred amount of antioxidant is about 0.01 to about 10 wt. percent of the total weight of the dielectric fluid. The antioxidant may include phenols such as phenolic and butylated hydroxytoluene. Other antioxidants known in the art which do not significantly increase the dissipation factor of the dielectric fluid may also be used. Mixtures of antioxidants are also contemplated.

Glyceryl triacetate has two significant characteristics which significantly improve upon the operating performance of high stress metallized film a-c capacitors as herein discussed. These characteristics are very little penetration of the dielectric liquid into the capacitor roll and very little imbibtion of the dielectric liquid into the plastic film. The low impregnation is caused by a relatively high contact angle for the fluid on the polypropylene plastic film which may also be described as a very low wetability of the film by the liquid. This lack of impregnation prevents the liquid from being present in the event of corona discharges and avoids the resulting generation of gasses and performance damaging ions. The low imbibtion of the liquid into the plastic film prevents weakening of the plastic film by swelling thereof and further avoids the presence of the liquid on the sites of harmful corona discharges.

However, this liquid does have one drawback as a dielectric fluid; that is, a low viscosity. To overcome this problem, the ERL-4221 was added which increased the viscosity two-fold with negligible changes in contact angle and swellability of the polypropylene film. The higher viscosity prevents, or at least slows down, penetration of the fluid through the ends of the roll.

Tests were done to determine the wetability (contact angle) and swellability of polypropylene film by glyceryl triacetate, dioctylphthalate (hereinafter DOP), and the fluid of the present invention with the following results.

| Wetability - Contact Angle (in degrees) @ 25° C. | |
| --- | --- |
| Glyceryl triacetate | 39° |
| DOP | 16° |
| Fluid of the present invention | 38° |

| Swellability (in percent) | 60° C. | 95° C. |
| --- | --- | --- |
| Glyceryl triacetate | 0.35 | 0.60 |
| DOP | 4.0 | 7.1 |
| Fluid of the present invention | 0.50 | 0.80 |

As indicated by the results, the contact angle for glyceryl triacetate is more than twice that of DOP which means that glyceryl triacetate has a much lower wetability of polypropylene film than does DOP. Further, the swellability of polypropylene film for glyceryl triacetate is much lower than for DOP. In fact, the glyceryl triacetate appears to imbibe into the polypropylene film by a factor of ten times less than DOP. These performance figures greatly reduce any intrusion of the dielectric liquid into the capacitor roll and thereby prevent the deleterious results therefrom.

During manufacturing, the capacitor body 10 of FIG. 1 is constructed by tightly winding the metallized polypropylene film on a hard roll to stretch the film in the roll wound direction. Terminal strips 23 and 24 are attached and the capacitor body 10 is enclosed in the housing 40. The capacitor is then heat treated in a vacuum for a period of time to cause the shrinkage of the polypropylene film in the roll wound direction and the resulting removal of air from the roll. Prior to this, the dielectric liquid described above has been prepared and refined by passing it through a Fuller's earth column and likewise heating it in a vacuum to help remove dissolved gasses. The heated liquid is then introduced into the capacitor 41 while still under vacuum condition to promote displacement of every possible bit of gas from the housing 41 by the dielectric liquid. After the capacitor has cooled, the hole may be easily sealed with solder.

As the following table shows, capacitance loss was remarkably improved when the ERL-4221 was added to the glyceryl triacetate in an amount of about 25 volume %. In accumulating the data, the listed fluids were purified by conventional methods with the addition 0.1 weight % butylated hydroxytoluene as an antioxidant. The capacitors and fluids were degassed under vacuum at elevated temperatures, filled with fluid and soldered.

| % Capacitance loss in Metallized Polypropylene Film Capacitors Rated 440 VAC/15 uF (10 Micro Thick) on Life Test 550 VAC, 2000 Hrs., 80° C. | | | | |
| --- | --- | --- | --- | --- |
| Fluid | % Cap Loss (% C) | Tested | Failed | (Hours) |
| DOP + 1.5 W/W % ERL 4221 | 5.8 | 6 | 0 | 2000 |
| Glyceryl Triacetate | 2.1 | 6 | 2 | 1483 |
| Glyceryl Triacetate + 1.3 W/W % ERL-4221 | 1.2 | 7 | 1 | 997 |
| 75 Volume % Glyceryl Triacetate + 25 Vol % ERL-4221 | 0.4 | 6 | 0 | 2000 |

What is claimed is:

1. In a capacitor, a dielectric fluid consisting essentially of 75 volume % glyceryl triacetate and 25 volume % 3,4-epoxycyclohexylemethyl-3,4-epoxycyclohexane carboxylate.

2. The dielectric fluid of claim 1, wherein an antioxidant in an amount of from 0.01 to about 10 wt. percent is added.

3. A capacitor, comprising:
a housing,
a pair of convolutely wound metallized film electrodes enclosed within said housing; and
a dielectric liquid consisting essentially of 75 volume % glyceryl triacetate and 25 volume % 3,4-epoxycyclohexylemethyl-3,4-epoxycyclohexane carboxylate.

4. The capacitor of claim 3, wherein said metallized film electrodes are formed on a plastic film selected from the group consisting of polypropylene, polyester, polycarbonate, polystyrene, polysulfone and polyethylene terephthalate.

5. The capacitor of claim 4, wherein the plastic film is biaxially oriented polypropylene.

* * * * *